United States Patent
Lilly

(10) Patent No.: US 6,863,854 B2
(45) Date of Patent: Mar. 8, 2005

(54) INSERT MOLD DECORATING FILM FOR THERMOPLASTIC RESIN AND METHODS FOR MAKING

(75) Inventor: Kenneth Lee Lilly, Evansville, IN (US)

(73) Assignee: General Electric, Pittsfield, MA (US)

( * ) Notice: Subject to any disclaimer, the term of this patent is extended or adjusted under 35 U.S.C. 154(b) by 0 days.

(21) Appl. No.: 10/627,147

(22) Filed: Jul. 25, 2003

(65) Prior Publication Data

US 2004/0104508 A1 Jun. 3, 2004

Related U.S. Application Data

(62) Division of application No. 09/513,793, filed on Feb. 25, 2000, now Pat. No. 6,682,805.

(51) Int. Cl.[7] ............................ B29C 45/14; B29C 47/04
(52) U.S. Cl. .................... 264/145; 264/160; 264/176.1; 264/259; 264/266; 156/245; 156/247
(58) Field of Search ................................. 264/145, 153, 264/160, 176.1, 510, 544, 553, 259, 266; 156/244.23, 242, 245, 247

(56) References Cited

U.S. PATENT DOCUMENTS

| | | | |
|---|---|---|---|
| 3,790,439 A | | 2/1974 | La Perre et al. |
| 4,351,920 A | | 9/1982 | Ariga et al. |
| 4,643,789 A | * | 2/1987 | Parker et al. ............... 156/219 |
| 4,659,625 A | | 4/1987 | Decroly et al. |
| 5,096,652 A | * | 3/1992 | Uchiyama et al. .......... 264/511 |
| 5,096,782 A | | 3/1992 | Dehennau et al. |
| 5,223,315 A | * | 6/1993 | Katsura et al. .......... 428/36.92 |
| 5,304,413 A | | 4/1994 | Bloom et al. |
| 6,136,441 A | * | 10/2000 | MacGregor et al. ........ 428/412 |
| 6,420,033 B1 | * | 7/2002 | Numrich et al. ............ 428/421 |
| 6,458,913 B1 | * | 10/2002 | Honigfort et al. .......... 528/196 |
| 6,547,912 B2 | * | 4/2003 | Enlow et al. .......... 156/244.23 |

* cited by examiner

Primary Examiner—Angela Ortiz

(57) ABSTRACT

A multi-layer printable thermoplastic film consisting of at least a fluoride polymer film having laminated thereto a polycarbonate film. The printable film is preformed (vacuum molding or thermoforming) and then inserted into a mold which has the configuration of the preformed printable film. A base layer of a thermoplastic such as a polycarbonate resin is injection molded to the exposed surface of the preformed printable film. The molded structure has exterior automotive applications such as lens, etc.

10 Claims, 2 Drawing Sheets

Lamination into First Nip

Lamination into Second Nip

INSERT MOLD DECORATING FILM FOR THERMOPLASTIC RESIN AND METHODS FOR MAKING

CROSS REFERENCE TO RELATED APPLICATIONS

This application is a division of U.S. application Ser. No. 09/513,793 filed 25 Feb. 2000 now U.S. Pat. No. 6,682,805.

FEDERALLY SPONSORED RESEARCH

Not applicable.

FIELD OF THE INVENTION

This invention relates to a multi-layer printable film, a molded article therewith, and to a process of preparing the molded article by Insert Mold Decoration (IMD).

BACKGROUND OF THE INVENTION

Vinyl fluoride (PVF) and vinylidene fluoride (PVdF) are thermoplastic polymers which exhibit a combination of advantageous properties and in particular, a high chemical inertness and an excellent resistance to ultraviolet rays.

Polycarbonate (PC) films generally have acceptable levels of clarity, and strength, but lack acceptable levels of birefringence, chemical and UV radiation resistance for exterior automotive applications. For example, PC films generally have high birefringence, which is, in part, due to the levels of stress which are placed on the film during its formation. This stress is frozen into the film upon cooling.

It is generally known in theory to produce PC films by extruding heated resin and passing the extruded resin through the nip formed between two polished metal rolls. This process is typically unsuitable for producing low birefringence films because it introduces a high level of stress in the films which increases the birefringence of said films. A low birefringence film is required for 3-dimensional thermoformed (vacuum or pressure forming) articles prepared by IMD for applications that require tight graphics registration. Low birefringence provides part to part dimensional consistency and printing registration wherein the decorated film is formed using heat.

In U.S. Pat. Nos. 4,659,625 and 5,096,782 issued to Solvay & Cie, a laminated structure, which comprises a layer of PVdF bonded to a layer of PC using a vinyl acetate polymer, is assembled by heat lamination or coextrusion. This prior art suffers from the lack of low birefringence in the laminated structure.

In U.S. Pat. No. 5,304,413 issued to DuPont, a laminated structure which comprises a layer of PVF bonded to a layer of PC using an acrylic polymer, is assembled by heat lamination. This prior art also suffers from lack of low birefringence in the laminated structure.

BRIEF SUMMARY OF INVENTION

The present invention is directed to multi-layer printable thermoplastic polymer films and articles and methods for making such films and articles. More particularly the article of this invention comprises a base layer of an injection molded, blow molded or extruded thermoplastic polymer and an overlay of a multi-layer printable film to form the multi-layer article. The multi-layer printable film preferably comprises a fluoride polymer layer laminated to a polycarbonate layer. Lamination can be through heat lamination or adhesive lamination.

The multi-layer printable film comprises an outer fluoride polymer layer to which is laminated a polycarbonate layer. The multi-layer printable film must have low birefringence and a low surface roughness, namely a smooth surface.

A method for producing the multi-layered printable film of this invention with properties of formability, low birefringence, chemical and UV radiation resistance and optical transparency is set forth herein. These laminated films are well suited for exterior automotive applications prepared by the IMD process. IMD is the process by which the pre-formed multi-layer printable film is placed in a mold and a thermoplastic polymer melt, which forms the base layer, is molded to the exposed side of the printable film which exposed side becomes the interface between the decorative multi layer overlay film and the base layer. The base layer to which the decorative overlay film is laminated can be any suitable thermoplastic resin. Suitable thermoplastic resins for use in this invention for the base layer are available from the GE Plastics component of General Electric Company under the trademarks: Lexan® (an aromatic polycarbonate), Cycolac® (an acrylonitrile-butadiene-styrene polymer [ABS]), Cycoloy® (an aromatic polycarbonate/ABS polymer composition), Noryl® (a modified polyphenylene ether resin composition), Valox® (polybutylene terephthalate) resin, Ultem® (polyetherimide) resin, homopolycarbonates, copolycarbonates, copolyestercarbonates, and mixtures thereof with other polymers.

DETAILED DESCRIPTION OF THE INVENTION

Figure 1:
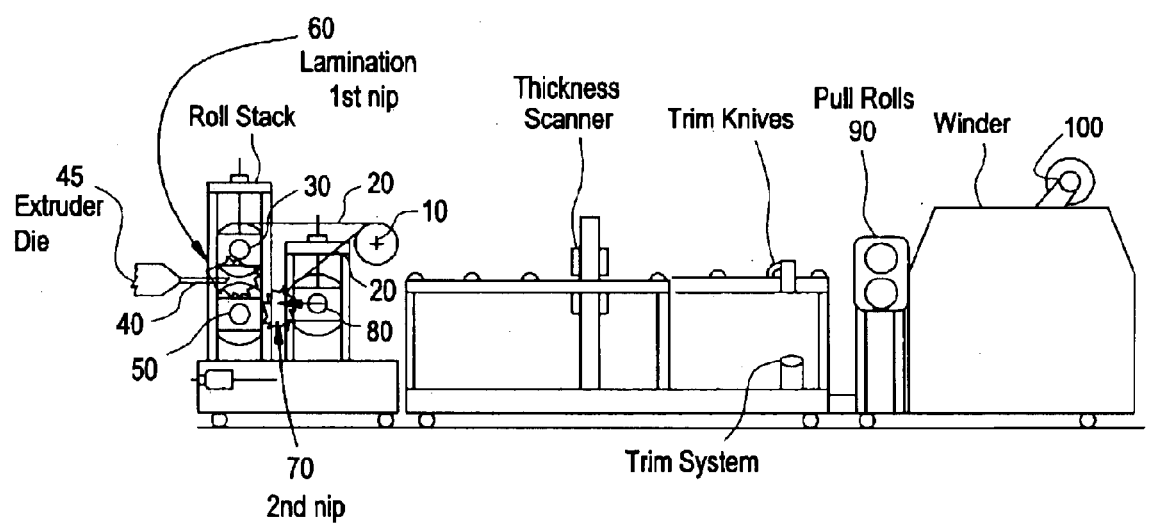
FIG. 1 illustrates a film extrusion line with lamination capability.

The multi-layer printable overlay film structure of this invention comprises a vinyl fluoride (PVF) or vinylidene fluoride (PVdF) polymer layer bonded to a polycarbonate layer by the use of a polymeric adhesive comprising an acrylic polymer or by heat lamination. The printable film means that the polycarbonate layer is printable or decorative by some means. Printing or decorating is preferably performed on the underside of the polycarbonate layer but may also be on the upper side of the polycarbonate layer, i.e. the surface which becomes the interface between the polycarbonate layer and fluoride layer. Generally, the fluoride layer is not printable but may be decorated by other means. This printable overlay film is preformed to the configuration of the interior surface of a mold. The preformed decorated overlay film is then inserted into a mold and the base layer or thermoplastic resin is injection molded to the exposed side in the mold of the printable overlay film. The "exposed" surface then becomes the interface between the printable overlay film and the injection molded base layer. While the base layer may be any of the above thermoplastic resins, polycarbonate resin is preferred.

The fluoride polymer and polycarbonate layers are first laminated together. A variety of laminating techniques can be used. However, heat lamination or acrylic adhesives are preferred for use in the present invention.

The multi-layer printable overlay film of this invention can be transparent, translucent, opaque or a combination thereof as desired. Transparent products are preferred embodiments of this invention. A description of an opaque multi-layer overlay film is provided in Example 7.

The key performance requirements of a transparent printable overlay film and articles is that it should (a) pass a scribe adhesion test, (b) have a % haze of less than 2.5%, (c) be able to be formed, and (d) have a birefringence of less than 20 nm. A low birefringence overlay film is required for 3-dimensional thermoformed (vacuum or pressure forming) articles prepared by IMD process for applications that require tight graphics registration.

For transparent, low birefringence, and smooth surface multi-layer overlay films, it may be necessary that the laminated film comprise an outer removable layer of a polyester film and a substrate of the multi-layer printable thermoplastic. The substrate preferably contains an ultraviolet absorber such as benzotriazole. Preferably the laminated film comprises: an oriented polyethylene terephthalate outer film of about 35–55 weight % preferably about 45 wt. %, an intermediate polyvinyl fluoride or polyvinylidene fluoride film of about 35–60 weight % preferably about 47 wt. % and a heat activated acrylic polymer adhesive of about 5–12 weight %, preferably about 8.0 wt. % in the event an acrylic polymer adhesive is employed instead of heat lamination. The weight % is based on the total weight of the laminated film. The outer surface of the laminated film preferably has a highly polished surface, i.e. the surface opposite the acrylic adhesive. The printable film layer comprises a transparent sub-layer of a thermoplastic polymer preferably an aromatic polycarbonate, an ABS, an aromatic polycarbonate/ABS composition or a modified polyphenylene ether composition over which is the fluoride polymer. More particularly the sub-layer is an aromatic polycarbonate resin. The polycarbonate film may vary in thickness from about 5 to about 30 mils. The thickness of the various components of the laminated film will vary depending on the desired weight % of each component. The polyester outer film is overlayed onto the fluoride polymer film in order to protect the fluoride surface from acquiring a rough surface texture when passed through the nip of calendering rolls. The polyester film is removed before the finished multi-layer printable film is stored and/or used to prepare an article by the IMD process. The polyester film is easily removed since it does not melt at the process temperature of preparing multi-layer printable film.

An opaque multi-layer structure comprises a layer of a fluoride polymer and a polycarbonaze sub-layer film. The fluoride layer is preferably a polyvinylidene fluoride polymer or polyvinyl fluoride polymer film of about 90 to 100 weight %, preferably about 95 wt. % and preferably an acrylic heat activated adhesive of about 2.0 to about 10.0 weight % preferably about 5.0 weight %. The composition may also contain an ultra-violet absorber such as benzotriazole. The opaque multi-layer overlay film may have a textured outer fluoride surface film opposite the polycarbonate sub-layer film of the printable multi-layer film which may be subsequently coated to provide a smooth surface having minimal roughness and a low birefringence. Furthermore, both the fluoride and PC surfaces may be textured, which may be subsequently coated to provide a smooth surface having minimal roughness and a low birefringence.

Alternatively, other layers may be interdisposed between the fluoride layer and the polycarbonate sub-layer (not the base layer) such as an acrylic copolymer or other polymer layers. Further, while the transparent multi-layer printable film has a removable polyester outer layer, the opaque multi-layer film may or may not have a removable polyester outer layer.

A preferred polycarbonate base layer for the present invention is one formed from a thermoplastic polycarbonate material, such as LEXAN® resin, a product of General Electric Company. Typical examples of polycarbonate resins are described in U.S. Pat. No. 4,351,920, which is incorporated herein by reference, and are obtained by the reaction of aromatic dihydroxy compounds with a carbonyl chloride. Other polycarbonate resins may be obtained by the reaction of aromatic dihydroxy compounds with carbonate precursors such as diaryl carbonates. U.S. Pat. No. 4,351,920 also describes various methods for the preparation of aromatic polycarbonate resins, which may also be used as substrates in preparing the printable film employed in the present invention. A preferred aromatic dihydroxy compound is 2,2-bis(4-hydroxy phenyl) propane, (i.e., Bisphenol-A). The term aromatic polycarbonate resins is also meant to include copolycarbonates and copolyester carbonates which copolyester carbonates are obtained from the reaction products of a dihydroxy phenol, a carbonate precursor and a dicarboxylic acid such as terephthalic acid and isophthalic acid. Optionally, an amount of a glycol may also be used as a reactant. A preferred grade of polycarbonate resin for this invention consists of an aromatic polycarbonate of more than 99 wt. % of bisphenol-A polycarbonate.

Figure 2:
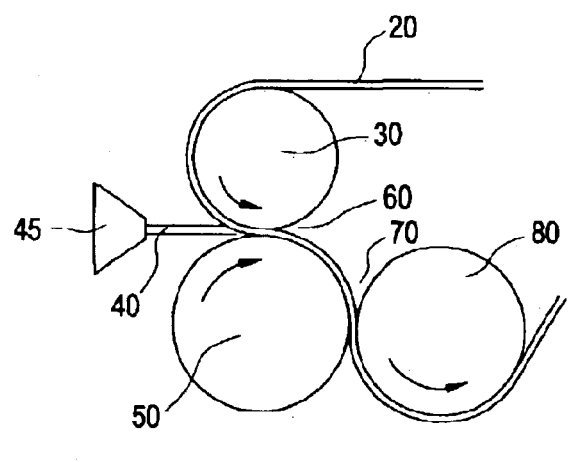
FIG. 2 illustrates lamination into a first or into a second nip.
Figure 2:
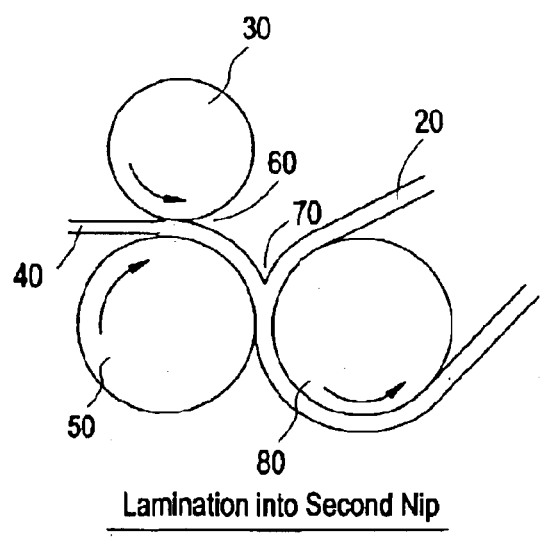

Referring to FIG. 1 and FIG. 2, extruded sheet or film of thermoplastic materials, including without limitation polycarbonate and polycarbonate blends, are conventionally produced by a method which comprises feeding thermoplastic resin into an extruder which heats the resin above its glass transition temperature (Tg), thereby producing a viscous melt of the thermoplastic material. The term multi-layer printable film or sheet is used interchangeably herein, and is used to refer to thermoplastic materials having a final thickness of about 5 to about 30 mils. The extruder rates should be in the range of 450 to 600 lbs/hr, with 530 lb/hr preferred. The viscous melt is passed, under pressure provided by the extruder , through an opening in die 45, which opening typically has the shape of an elongated rectangle or slot. The viscous melt assumes the shape of the die slot, thereby forming a continuous sheet or film of molten extrudate 40. The die center zone temperatures should be in the range of 550–650 F, with 600 F preferred. The die edge zone temperatures should be in the range of 550–650 F, with 620 F preferred. The higher edge temperature will compensate for the film edge cooling at a faster rate than the film center. The film of molten extrudate 40 is then passed through a finishing apparatus to form finished sheet or film articles.

A conventional finishing apparatus is a two-roll finishing or polishing stack, comprising an opposing upper roll 30 and lower roll 50 spaced apart by a distance that generally corresponds to the desired thickness of the finished thermoplastic sheet or film. Such rolls are also sometimes referred to as calendering rolls and the gap or nip therebetween and is shown as nip 60 of the finishing stack. A typical finishing stack comprises opposing upper 30 and lower 50 steel rolls which are approximately 12 to 20 inches in diameter. Roll 30 is covered with an elastomer material, such as rubber. Roll 50 has a chrome plated surface with a surface roughness of about 0.05 $\mu$m. These rolls are generally cooled internally by passing a fluid through the interior of the rolls using known apparatus and methods for cooling. The temperature of the surface of the rolls can be controlled by this method. The temperature of roll 30 should be maintained between 60–120 F, with 90 F being preferred. The temperature of roll 50 should be maintained between 180–240 F, with about 215 F being preferred. After the finished sheet or film exits from nip 60 of the finishing stack, it typically enters second nip 70 of the rollstack. This second nip comprises an opposing roll 50 and roll 80 spaced apart by a distance that generally corresponds to the desired thickness of the finished thermoplastic sheet or film. Roll 80 is covered with an elastomer material, such as rubber. The film passes through a thickness scanner, through the pull rolls 90, and is wound onto the winder 100. The motor driving the pull rolls 90 should be maintained between 2–5 amps, with 3 amps preferred.

The lamination maybe conducted in first nip 60 or second nip 70. The "ready to laminate" fluoride film is supplied on a roll and is a raw material to the process shown in FIG. 1. One "ready to laminate" film construction comprises a 2.0 mil oriented polyethylene terephthalate (OPET) film/2 mil PVF film/10 gr/m² of acrylic adhesive. Another film construction is: 1.5 mil OPET liner/2 mil PVdF/10 gr/m² acrylic adhesive.

The cross section of the layers within first nip 60 comprises:

Roll 30/1.5 mil OPET liner/2.0 mil PVF/10 gr/m² acrylic adhesive/10 mil PC melt/Roll 50.

1.5 mil OPET, two mil PVF and 10 mil PC were used as examples only. A number of practical combinations exist for materials and thickness. No changes were made to handle the laminate in downstream equipment. The only exception is that the OPET liner film is removed before pull rolls 90 to avoid wrinkling in winder 100. The following equipment is preferred to dispense lamination film 10 over first roll 30 and into first nip 60. Single position center unwind, Spreader roll, Brake Tension (0.1 to 1.0 pli), Unwind tension control by load cell, and Inflatable air shaft. This equipment will be familiar to those skilled in the art.

The temperature of rolls 30 and 50 is controlled to a temperature that is below Tg of the thermoplastic material that is being processed. In the gap between the rolls, the surfaces of the sheet or film are abruptly vitrified via contact with the calendering rolls. Therefore, upon contact with the rolls, only the interior portion of the film remains in the thermoplastic or molten state.

The elastomeric covering on rolls 30 and 80 is preferably made from silicone rubber or another heat resistant elastomer. A suitable thickness for the elastomeric covering is believed to be about 0.3 to 1.0 inches, with a thickness of 0.3 to 0.5 inches being preferred. The elastomeric material is preferred because it has a low compressive strength, and reduces the shear stress applied to extrudate as it passes through nip 60 and 70. The elastomeric material is also preferred because it is heat resistant and retards the cooling rate of the melt. The birefringence of the extruded product has been observed to be directly related to this compressive shear stress and slow cooling rate such that the optical birefringence can be controlled. It will be understood by those skilled in the art of extrusion and annealing amorphous thermoplastics films, such as polycarbonate, that as the extrudate cools, it shrinks. Any applied stress (compressive or tensile) will inhibit the shrinkage. The extent of shrinkage depends upon the material's melt temperature, glass transition temperature and roll temperature. When the thermoplastic is cooled below Tg, (about 280° F. for polycarbonate), no more shrinkage is believed to occur, and thus any introduced stresses are trapped within the vitrified material. The film is extremely sensitive to deforming forces during vitrification. Even small deforming forces will lead to shear between already vitrified and still molten zones. At the boundaries between these zones, the shear stresses are thought to cause molecular orientation which may be stored in the vitrified material as intrinsic stress. A beam of light passing through such orientated regions exhibits an unacceptable optical birefringence.

Typically, roll 30 has an average surface roughness (Ra) of 40–70 μm, while roll 80 has an Ra of 3–5 μm. These roll surfaces are finished with conventional techniques that will be familiar to those skilled in the art.

EXAMPLES OF THE INVENTION

The following examples are presented to illustrate this invention and should not be construed to limit the scope of this invention.

Example 1

| Materials: | Names: |
|---|---|
| Adhesive/2 mil PVdF/1.5 mil OPET | K-1 |
| Adhesive/1 mil PVF (med. Gloss) | T-1 |
| Adhesive/1 mil PVF (high gloss) | T-2 |

| Lamination Performance: | | | | | | |
|---|---|---|---|---|---|---|
| Material | K-1 | K-1 | T-1 | T-1 | T-2 | T-2 |
| Nip Location | 1st | 2nd | 1st | 2nd | 1st | 2nd |
| % Light Transmission (LT) | 91.3 | 88.4 | 87 | 89.5 | 90.3 | 88.9 |
| % Haze | 1 | 59.7 | 43.6 | 46.9 | 24.7 | 35.5 |
| Yellowness Index (YI) | 0.7 | 1.2 | 1.1 | 1.2 | 2.1 | 1.3 |
| Birefringence | 15 | 45 | 75 | 90 | 60 | 80 nm |
| Gloss 60 | >100 | >100 | 22–46 | 43–54 | 22–42 | >100% |
| Gloss 85 | >100 | 90–99 | 32–58 | 50–55 | 40–70 | 88–93% |
| Cross Hatch | pass | pass | pass | pass | pass | pass |

As shown in Example 1, only the K-1 material which is laminated in the 1st nip will meet the design criteria i.e. pass scribe adhesion test, % haze of less than 2.5, formability, and birefringence of less than 20 nm. A low birefringence film is required for transparent 3-dimensional thermoformed (vacuum or pressure forming) Insert Mold Decorated applications that require tight graphics registration. This data would indicate the 1.5 mil OPET liner used in material K-1 is preferred. The oriented polyester liner film enhances low surface roughness/high gloss of the laminate produced. As the surface roughness decreases the gloss increases.

The LT, YI, and haze were measured using a Gardner colorimeter in the transmission mode.

Example 2

Lamination Process Performance

| Lamination Process Performance | | | |
|---|---|---|---|
| Material | PC | PC | PC |
| Nip Location | 1st only | 1st & 2nd | 1st & 2nd |
| R2 temp | 200° F. | 200° F. | 220° F. |
| Birefringence | 12–15 nm | 20–25 nm | 30–40 nm |

As shown in Example 2, if the PC film is nipped in multiple locations, the birefringence will increase. The process must operate with the 1st nip closed. Closing the 2nd nip is optional. The lamination film maybe introduced into the 1st or 2nd nip; however, the 1st nip is preferred in order to minimize the birefringence.

Example 3

Lamination of Film to Extruded PC Film

The laminate comprising a 2 mil PVF layer is bonded to a 10 mil PC layer was manufactured under the conditions illustrated.

| Extruder | Die | Roll Stack |
|---|---|---|
| Z1 = 450° F. | Z1 = 620° F. | R1 = 90° F. |
| Z2 = 470° | Z2 = 600° | R2 = 216° |
| Z3 = 481° | Z3 = 600° | R3 = 260° |
| Z4 = 490° | Z4 = 600° | R1/R2 nip = closed |
| Z5 = 492° | Z5 = 620° | R2/R3 nip = open |
| Z6 = 502° | | |

Line speed = 37.4 fpm.  Melt temp. = 500° F.
Head Pressure = 3050 psi  Rate = 530 lb/hr
Pull roll = 2.8 amps These conditions as shown in Example 3, will produce a laminate with properties as shown in Example 1 (K-1 laminated into 1st nip).

Example 4

Lamination of Another Film to Extruded PC Film

The laminate comprising a 2 mil PVdF layer bonded to a 20 mil PC layer was manufactured under the conditions illustrated .

| Extruder | Die | Roll Stack |
|---|---|---|
| Z1 = 450° F. | Z1 = 620° F. | R1 = 90° F. |
| Z2 = 470° | Z2 = 600° | R2 = 216° |
| Z3 = 481° | Z3 = 600° | R3 = 260° |
| Z4 = 490° | Z4 = 600° | R1/R2 nip = closed |
| Z5 = 492° | Z5 = 620° | R2/R3 nip = open |
| Z6 = 502° | | |

Line speed = 18.6 fpm.  Melt temp. = 490° F.
Head Pressure = 3010 psi  Rate = 530 lb/hr
Pull roll = 2.8 amps These conditions as shown in Example 4, will produce a laminate with properties as shown in Example 1 (K-1 laminated into 1st nip).

Example 5

Print Decoration & Forming

The film made in Example 4 was printed with a polyester based ink using a 230 mesh screen. The decorated film was then thermoformed at 350–400° F. using a "zero gravity" process. This process comprises a sealed thermoformer that allows the application of positive air pressure under the film during preheating and eliminates film sagging. The decorated laminate film must be dried before forming to remove the water from the polycarbonate layer. The preferred drier conditions are: 250° F. for 15 minutes (10 mil film) and 30 minutes (25 mil film).

The part to part dimensional consistency using these printed laminations has been documented. A Ternes registration and Optimeasure system was used to make these measurements after forming, the average part to part dimensional consistency was 2.8 mil with a standard deviation of 3.2 mil. The upper specification limit provided by the IMD film customer is 15.7 mil over a 10 inch length.

Example 6

In Mold Decoration

| Resin Melt temps. = 570–590° F. | | Barrel set temps. |
|---|---|---|
| Times | inject = 10 seconds | Nozzle = 590° F. |
| | cool = 22 seconds | Front = 590° F. |
| | cycle = 1 second | Middle = 590° F. |
| Injection velocity = 4.5 in/sec (75% ram) | | Rear = 590° F. |
| Hold pressure = 625 psi. | | Tool set temps = 190° F. |
| Screw speed 80 RPM. | | |

A 4"×6" laminated film sample was decorated and formed as in Example 5. After placement into the mold, of an injection molding machine, a pull tab was taped onto the exposed surface. This tab was used for adhesion testing once the multi-layer printed film was molded under the conditions provided in Example 6.

A typical base layer thickness is 2.5 mm.

The formed article was then tested in order to determine if it had adequate adhesion. Adequate adhesion is defined as greater than 10 lb/inch using a 90 degree peel test. All samples demonstrated adequate adhesion. The adhesion test was conducted on a Model 6025 Instron. The peel rate was 0.4 inch/minute.

Example 7

Lamination of Film to Extruded PC Film to Make an Opaque/Textured Film

The laminate comprising a 1.0 mil PVF layer bonded to a 15.0 mil PC layer was prepared under the conditions illustrated below:

| Extruder | Die | Roll Stack |
|---|---|---|
| Z1 = 460° F. | Z1 = 566° F. | R1 = 260° F., 701 textured steel roll. |
| Z2 = 470° | Z2 = 554° | R2 = 105° F., Silicone rubber roll. |
| Z3 = 480° | Z3 = 547° | R3 = 350° F. |
| Z4 = 490° | Z4 = 586° | R1/R2 nip = closed |
| Z5 = 500° | Z5 = 587° | R2/R3 nip = open |
| Z6 = 505° | | |

Line speed = 13.9 fpm  Melt temperature = 415° F.
Head pressure = 2000 psi  Rate = 375 lb/hr
Pull rolls = 2.8 amps The conditions produced a laminate with properties:

% light transmission=80.0 to 91.0

% haze=100% edge curl=0.25" which indicates flatness in cross-web direction.

Warpage =0.30", which indicates flatness in machine direction.

UL 94 Flammability Rating=VTM-0

Surface roughness (Ra) microns

Top (PVF side)=30–45

Bottom (PC side)=20–40

Although the present invention has been described and illustrated in detail, it is clearly understood that the same is by way of illustration and example only and is not to be taken by way of limitation; the spirit and scope of the present invention being limited only in terms of the appended claims.

What is claimed is:

1. A process for forming a molded structure which process comprises forming a thermoplastic printable film comprising a fluoride polymer by laminating an extruded polycarbonate film to the fluoride polymer under heat and pressure, wherein, during the laminating, surfaces of the extruded polycarbonate film vitrify and an interior portion of the polycarbonate film remains in a thermoplastic or molten state, preforming the printable film to a predetermined configuration, placing the preformed printable film in a mold in which the inner surface of the mold conforms to the configuration of the preformed printable film and the fluoride polymer film is in contact with the inner surface of the mold; and molding by injection molding a thermoplastic base layer to an exposed side of the printable preformed film.

2. The process of claim 1 wherein the injection molding base layer is a polycarbonate resin.

3. The process of claim 1 wherein the process further comprises forming a printable film comprised of a removable polyester film, an intermediate film of the fluoride polymer and the polycarbonate layer laminated to the fluoride polymer and then removing the polyester film.

4. The process of claim 1 wherein the polyester film is removed prior to preforming the printable film.

5. The process of claim 1, wherein the thermoplastic printable film has a percent haze of less than 2.5 percent and a birefringence of less than 25 nanometers.

6. A process for forming a molded structure comprising the steps of:

extruding a thermoplastic polycarbonate resin to form an thermoplastic polycarbonate film;

laminating the thermoplastic polycarbonate film to a fluoride polymer under heat and pressure to form a printable film, wherein, during the laminating, a temperature of any calendering rolls is controlled to a temperature that is below a glass transition temperature of the thermoplastic polycarbonate film and is effective to vitrify surfaces of the thermoplastic polycarbonate film while an interior portion of the polycarbonate film remains in a thermoplastic or molten state;

cooling the printable film at a rate effective to have a percent haze of less than 2.5 percent and a birefringence of less than 25 nanometers;

preforming the printable film to a predetermined configuration;

placing the preformed printable film in a mold in which an inner surface of the mold conforms to a configuration of the preformed printable film and the fluoride polymer film is in contact with the inner surface of the mold; and injection molding a thermoplastic base layer to an exposed side of the preformed printable film.

7. The process of claim 6, wherein the injection molding base layer is a polycarbonate resin.

8. The process of claim 6, the process further comprises forming a printable film comprised of a removable polyester film, an intermediate film of the fluoride polymer, and the polycarbonate layer laminated to the fluoride polymer, and then removing the polyester film.

9. The process of claim 6, wherein the polyester film is removed prior to preforming the printable film.

10. A process for forming a molded structure comprising:

extruding a thermoplastic polycarbonate resin to form an thermoplastic polycarbonate film;

laminating the thermoplastic polycarbonate film to a fluoride polymer under heat and pressure to form a printable film;

cooling the printable film at a rate effective to have a percent haze of less than 2.5 percent and a birefringence of less than 25 nanometers;

preforming the printable film to a predetermined configuration;

placing the preformed printable film in a mold in which an inner surface of the mold conforms to a configuration of the preformed printable film and the fluoride polymer film is in contact with the inner surface of the mold; and molding by injection molding a thermoplastic base layer to an exposed side of the preformed printable film.

* * * * *